US012123385B2

(12) United States Patent
Skowronek et al.

(10) Patent No.: US 12,123,385 B2
(45) Date of Patent: Oct. 22, 2024

(54) IGNITION DEVICE FOR AN INTERNAL COMBUSTION ENGINE

(71) Applicant: Robert Bosch GmbH, Stuttgart (DE)

(72) Inventors: Tim Skowronek, Missen-Wilhams (DE); Bernd Fischer, Weitnau (DE); Hartwig Senftleben, Oberstdorf-Tiefenbach (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/257,252

(22) PCT Filed: Dec. 7, 2021

(86) PCT No.: PCT/EP2021/084503
§ 371 (c)(1),
(2) Date: Jun. 13, 2023

(87) PCT Pub. No.: WO2022/128603
PCT Pub. Date: Jun. 23, 2022

(65) Prior Publication Data

US 2024/0093664 A1 Mar. 21, 2024

(30) Foreign Application Priority Data

Dec. 16, 2020 (DE) ..................... 10 2020 215 994.7

(51) Int. Cl.
*F02P 3/055* (2006.01)
*F02P 3/04* (2006.01)
*F02P 15/00* (2006.01)

(52) U.S. Cl.
CPC .................................. *F02P 3/0552* (2013.01)

(58) Field of Classification Search
CPC ................................ F02P 3/0552; F02P 11/00
See application file for complete search history.

(56) References Cited

U.S. PATENT DOCUMENTS 6,116,226 A 9/2000 Vogel
7,418,956 B2 9/2008 Aida et al.
(Continued)

FOREIGN PATENT DOCUMENTS

DE 102013202016 A1 8/2013

OTHER PUBLICATIONS

Translation of International Search Report for Application No. PCT/EP2021/084503 dated Mar. 31, 2022 (2 pages).

*Primary Examiner* — Phutthiwat Wongwian
*Assistant Examiner* — Arnold Castro
(74) *Attorney, Agent, or Firm* — Michael Best & Friedrich LLP

(57) ABSTRACT

The invention relates to an ignition device (1) for an internal combustion engine, more particularly for a hydrogen-fueled internal combustion engine, comprising a primary circuit (2.1) and a secondary circuit (2.2), wherein—the primary circuit (2.1) has a primary coil (3), wherein—the secondary circuit (2.2) has a secondary coil (4) inductively coupled to the primary coil (3), a diode (5) for suppressing a start-up spark, and a high-voltage connector (6) for connection to a spark plug (7), characterized in that a parallel path (10) is formed electrically in parallel to the diode (5) of the secondary circuit (2.2), in which parallel path there is arranged an ohmic load resistor (11) or an electric switch (20) and by means of which parallel path residual energy, in particular residual voltage, which remains in the secondary circuit (2.2) following discharge of the ignition device (1), can be extinguished, in particular by feeding the residual energy in the secondary circuit (2.2) past the diode (5), bypassing the diode (5).

11 Claims, 4 Drawing Sheets

(56) References Cited

U.S. PATENT DOCUMENTS

| | | | | |
|---|---|---|---|---|
| 2017/0207618 | A1* | 7/2017 | Miyazawa ............ | F02P 3/0552 |
| 2017/0338737 | A1* | 11/2017 | Kohama ............... | H02M 3/156 |

* cited by examiner

IGNITION DEVICE FOR AN INTERNAL COMBUSTION ENGINE

BACKGROUND

The invention relates to an ignition device for an internal combustion engine.

An ignition device for an internal combustion engine is already known from DE102013202016 A1, comprising a primary circuit and a secondary circuit, the primary circuit having a primary coil and the secondary circuit having a secondary coil inductively coupled to the primary coil, a diode for suppressing a start-up spark, and a high-voltage connector for connection to a spark plug.

After each ignition, residual energy may remain in the secondary circuit of the ignition apparatus in the form of a residual voltage, which can in unfavorable cases lead to undesirable ignition and cause damage to the intake manifold of the engine, e.g., in the throttle valve and/or in the suction tube as a result.

By contrast, the ignition device according to the has the advantage that unwanted ignition is ruled out or at least avoided by forming a parallel path that is electrically parallel to the diode of the secondary circuit. According to a first variant, an ohmic load resistor can be arranged in the parallel path. Or, according to a second variant, an electric switch can be arranged in the parallel path. By means of the parallel path, residual energy, in particular residual voltage remaining in the secondary circuit after discharge of the ignition device, can be extinguished, in particular because the residual energy in the secondary circuit can be fed past the diode, bypassing the diode.

It is particularly advantageous when the ohmic load resistor of the parallel path according to the first exemplary embodiment comprises an electric resistance that is greater than 1 MOhm and/or that is in particular in the range between 10 MOhm and 100 MOhm. In this way, on the one hand, an electrically conductive connection for the residual energy is provided in the parallel path on the one hand, and on the other hand, the start-up spark suppressing effect of the diode is only slightly weakened, so that it is ensured that no start-up sparks are generated when the primary current in the primary circuit is switched on.

It is further advantageous when the ohmic load resistor of the parallel path according to the first exemplary embodiment is a wired resistor, a SMD resistor, or a conductor resistor. If the diode is designed to be on a circuit board, e.g., as an SMD component, then a load resistor designed as an SMD resistor would be advantageous. If the diode is a wired component, then a wired load resistor or a load resistor designed as the conductor resistor would be advantageous.

It is very advantageous for the conductor resistor to comprise an electrically conductive material designed as a layer, coating, conductive track, or jacket. For example, the entire parallel path is designed as a continuous conductor resistor. In this way, the load resistor can be designed particularly inexpensively.

In addition, it is advantageous when the conductor resistor is arranged and/or formed on the surface of the diode. In this way, the diode forms a support element for the load resistor and for forming the parallel path.

It is also advantageous when the electric switch of the parallel path is designed be switchable between a spark breakaway and a recharging of the primary circuit at an appropriate time. The switch can in this way be switched to the closed state at the appropriate time, whereby the parallel path for the residual energy is connected so that the residual energy can be conducted past the diode while bypassing the diode, thus leading to dissipation of the residual energy. For example, the switch of the parallel path can be a semiconductor switch, in particular a transistor.

It is further advantageous when the connector ends of the parallel path are connected to the connectors of the diode.

It is further advantageous that the residual energy can be conducted via the parallel path to an electric ground for dissipation, in particular via the primary circuit or via a ground connection of the secondary circuit.

Furthermore, it is advantageous that the secondary coil comprises a first coil end facing the high-voltage connector and a second coil end facing away from the high-voltage connector, in which case the secondary circuit comprises a high-voltage path connected to the first coil end of the secondary coil and a ground path connected to the second coil end of the secondary coil. According to the invention, the diode can be arranged in the ground path or in the high-voltage path.

It is advantageous when the ignition device according to the invention is designed to be on an ignition coil and is thus arranged within a closed component unit. The integration of the ignition device into the ignition coil offers advantages in terms of electric insulation and design space.

BRIEF DESCRIPTION OF THE DRAWINGS

Three exemplary embodiments of the invention are shown in simplified form in the drawings and explained in greater detail in the subsequent description.

DETAILED DESCRIPTION

Figure 1:
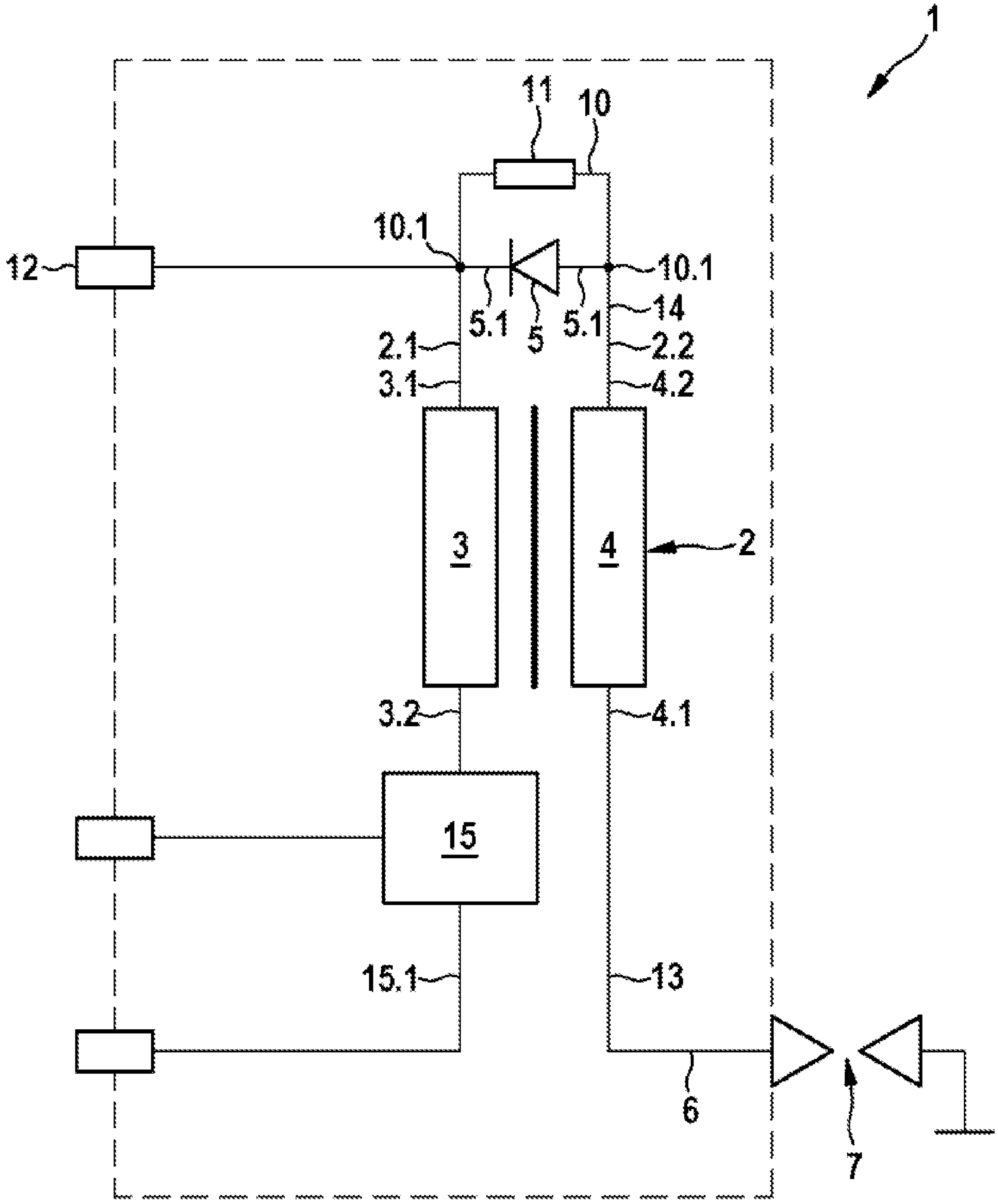
FIG. 1 shows an inventive ignition device according to a first exemplary embodiment comprising a parallel path according to a first variant.

FIG. 1 shows, in the form of an equivalent circuit diagram, an ignition device according to the invention according to a first exemplary embodiment comprising a parallel path according to a first variant.

The ignition device 1 according to the invention is used to generate a high electric voltage in order to generate an ignition spark for operating an internal combustion engine, e.g., a hydrogen-fueled internal combustion engine. For example, the engine is used to drive a vehicle.

The ignition device 1 according to the invention comprises a transformer 2 having a primary circuit 2.1 and a secondary circuit 2.2. The primary circuit 2.1 comprises a primary coil 3. The secondary circuit 2.2 has a secondary coil 4 inductively coupled to the primary coil 3, a diode 5 for suppressing a start-up spark, and a high-voltage connection 6 for connection to a spark plug 7. The ignition device 1 according to the invention can be designed to be partially or entirely on an ignition coil.

According to the invention, a parallel path 10 is designed to be electrically parallel to the diode 5 of the secondary circuit 2.2, in which, according to the first variant, an ohmic load resistor 11 is arranged and can be dissipated by means of the residual energy, in particular a residual voltage remaining in the secondary circuit 2.2 after the ignition device 1 discharges. The dissipation of the residual energy occurs because the residual energy in the secondary circuit 2.2 can be conducted to bypass the diode 5 before reaching the diode 5 via conduction to the parallel path 10 and an electric ground. According to the first exemplary embodiment, the residual energy can reach the electric ground via the primary circuit 2.1, e.g., via a low-voltage connector 12 of the primary circuit 2.1. For example, the low-voltage connector 12 of the primary circuit 2.1 is provided for connection to a positive connector of a battery of the vehicle.

The parallel path 10 therefore provides an electrically conductive connection for the residual energy at any given time without losing or canceling the start-up spark suppressing effect of the diode 5. To achieve this, the ohmic load resistor 11 of the parallel path 10 features, e.g., an electric resistance that is greater than 1 MOhm and that ranges, e.g., between 10 MOhm sand 100 MOhms. The ohmic load resistor 11 of the parallel path 10 can be, e.g., a wired resistor, an SMD resistor, or a conductor resistor. Given a design of the load resistor 11 as the conductor resistor, an electrically conductive material is provided for the conductor resistor, which can be designed as, e.g., a layer, a coating, a conductive track, or a jacket. For example, the jacket can be an electrically conductive, heat-shrinkable tubing. For example, the layer, coating, or conductive track can be printed, steamed, or generated by sputtering. The load resistor 11, which is designed as a conductor resistor, can, e.g., be arranged and/or designed to be on the surface of the diode 5 or on a diode body of the diode 5.

The connector ends 10.1 of the parallel path 10 can be connected to the connectors 5.1 of the diode 5. For example, the conductor resistor can extend along the surface of the diode 5 to the connectors 5.1 of the diode 5.

The secondary coil 4 comprises a first coil end 4.1 facing the high-voltage connector 6 and a second coil end 4.2 facing away from the high-voltage connector 6, in which case the secondary circuit 2.2 comprises a high-voltage path 13 connected to the first coil end 4.1 of the secondary coil 4 and a ground path 14 connected to the second coil end 4.2 of the secondary coil 4.

The diode 5 can be arranged in the secondary circuit 2.2 at any location, i.e., in the ground path 14 or in the high-voltage path 13, and it comprises the parallel path 10 according to the invention. According to the first exemplary embodiment, the diode 5 is arranged in the ground path 14, in which case the ground path 14 is connected to the primary circuit 2.1 following what is referred to as the austerity circuit by electrically connecting a connector 5.1 of the diode 5 to the low-voltage connector 12 of the primary circuit 2.1.

The primary coil 3 of the primary circuit 2.1 has a first coil end 3.1 and a second coil end 3.2, in which case the first coil end 3.1 is electrically connected to the low-voltage connector 12, and the second coil end 3.2 is electrically connected or electrically connectable to an ignition end stage 15 provided for switching the primary current in the primary circuit 2.1. According to the exemplary embodiments, the ignition end stage 15 is part of the ignition device 1 according to the invention, but it can clearly also be implemented outside of the ignition device 1, e.g., in an internal combustion engine control unit. In addition to the connection to the second coil end 3.2 of the primary coil 3, the ignition output stage 15 has a connector 15.1 for connection to an electric ground, e.g., a body or vehicle ground.

Figure 2:
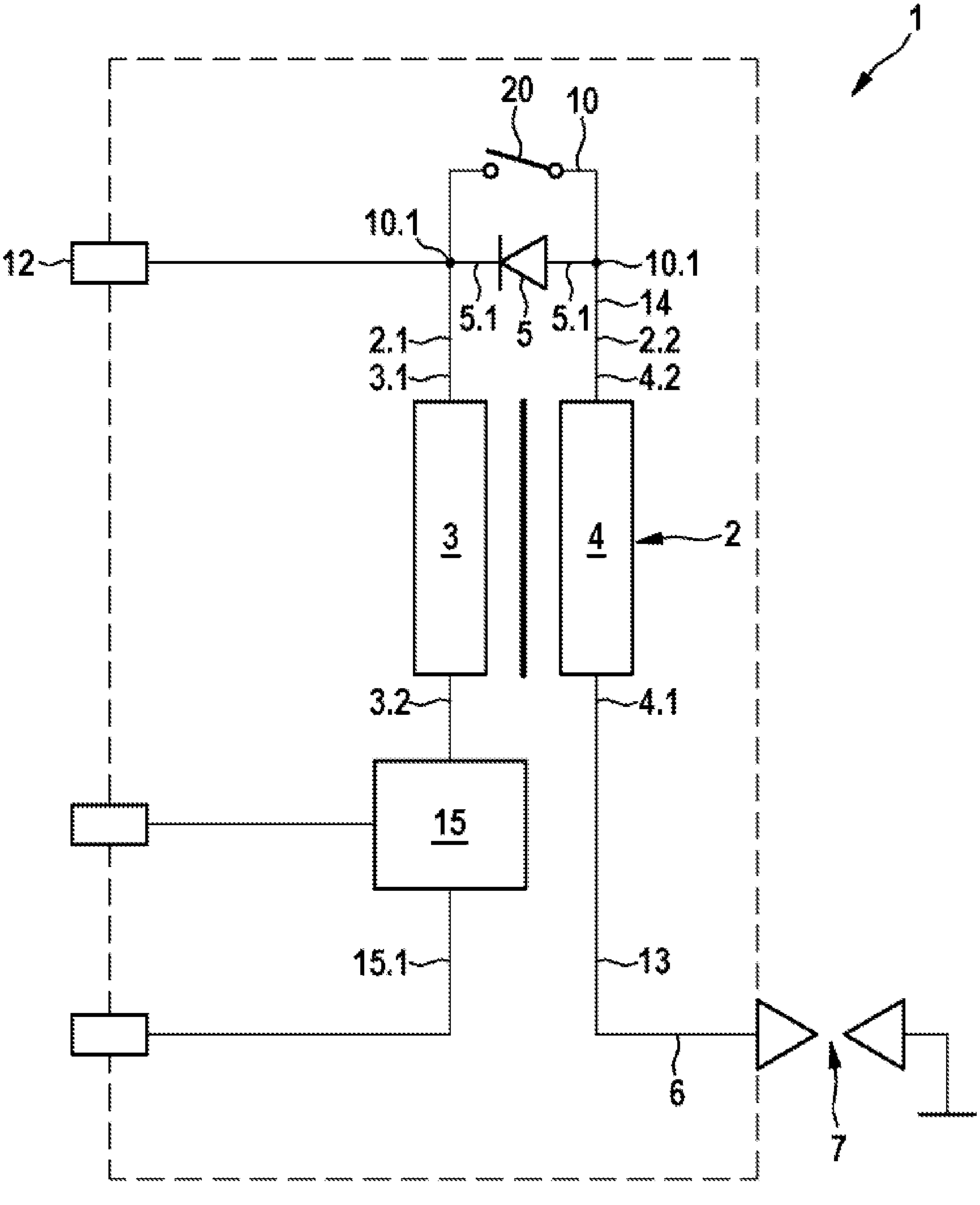
FIG. 2 shows an inventive ignition device according to the first exemplary embodiment shown in FIG. 1 comprising a parallel path according to a second variant.

FIG. 2 shows an ignition device according to the invention according to the first exemplary embodiment according to FIG. 1 comprising a parallel path according to a second variant.

The ignition device according to FIG. 2 differs from the ignition device according to FIG. 1 only in the design of the parallel path 10. According to the second variant, in the parallel path 10, no ohmic load resistor 11 is provided, but rather an electric or electronic switch 20 is provided. The switch 20 of the parallel path 10 is designed to be switchable to the closed state between a spark breakaway of a previous ignition and a recharging of the primary circuit 2.1 at a suitable time. As a result, the parallel path 10 is electrically connected at the appropriate time so that residual energy can be dissipated at the appropriate time. For example, the switch 20 can be a semiconductor switch, in particular a transistor.

Figure 3:
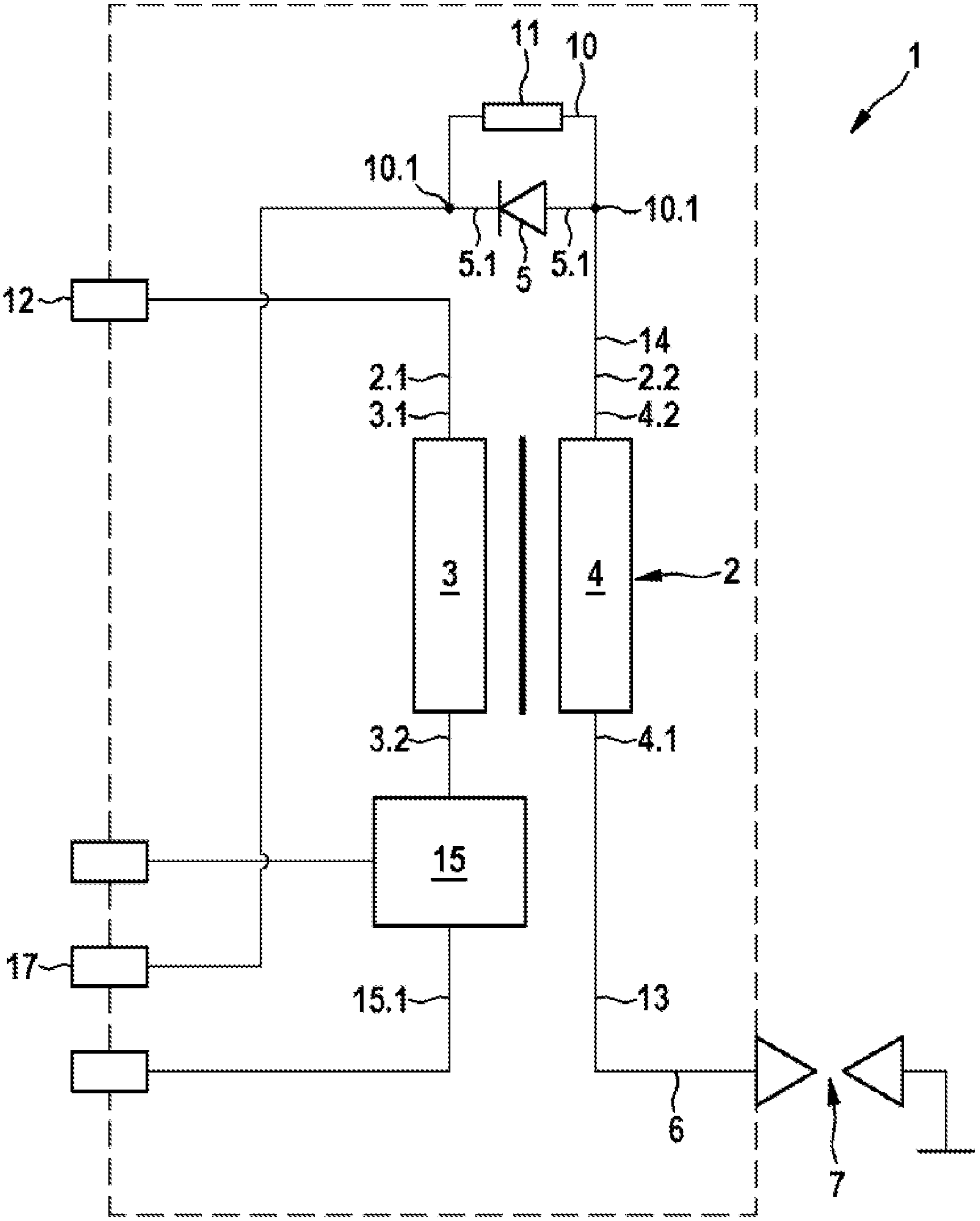
FIG. 3 shows an inventive ignition device according to a second exemplary embodiment comprising a parallel path according to the first variant.

FIG. 3 shows, in the form of a replacement circuit diagram, an ignition device according to the invention according to a second exemplary embodiment, with a parallel path according to the first variant with the ohmic load resistor.

The diode 5 is arranged in the ground path 14 according to the second exemplary embodiment, as in the first exemplary embodiment. According to the invention, the parallel path 10 is provided electrically parallel to the diode 5 of the secondary circuit 2.2.

The second exemplary embodiment differs from the first exemplary embodiment according to FIG. 1 only in that the ground path 14 is not connected to the primary circuit 2.1, but rather via a ground connection 17 to an electric ground, e.g. a vehicle ground.

Of course, the parallel path 10 according to the invention can also be designed to comprise the switch 20 according to the second embodiment.

Figure 4:
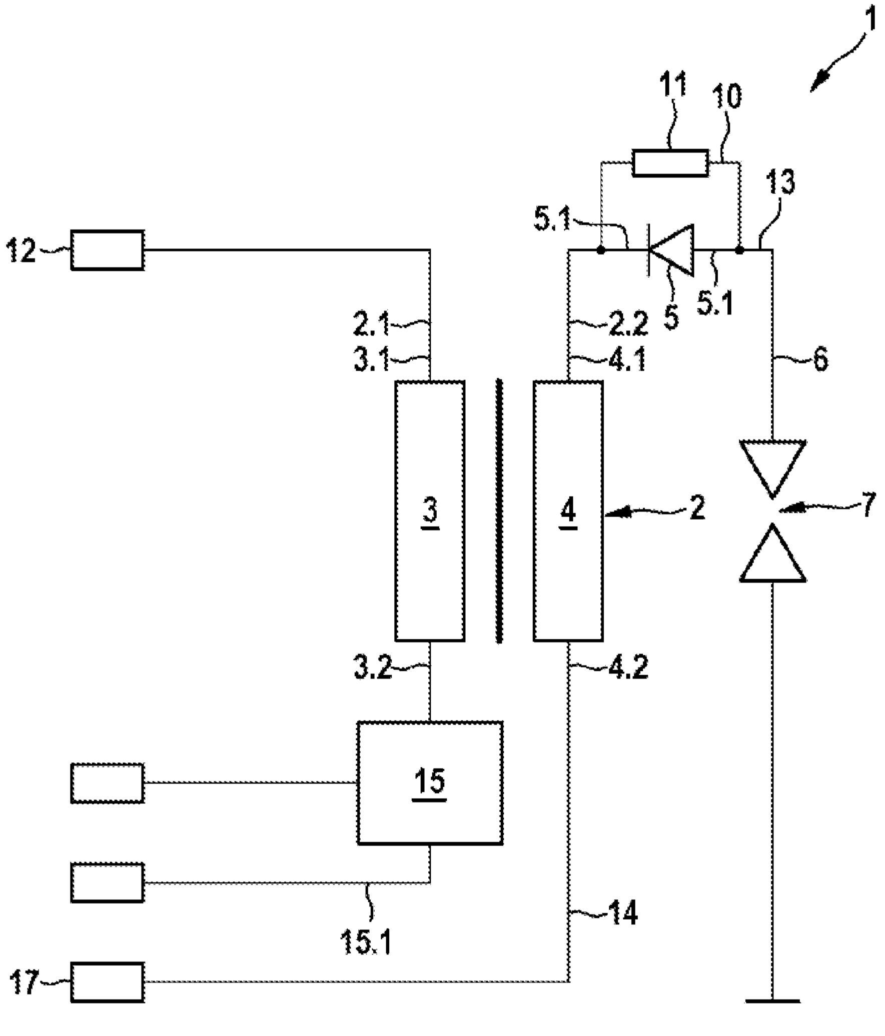
FIG. 4 shows an inventive ignition device according to a third exemplary embodiment comprising a parallel path according to the first variant.

FIG. 4 shows, in the form of an equivalent circuit diagram, an ignition device according to the invention according to a third exemplary embodiment comprising a parallel path according to the first variant.

The third exemplary embodiment differs from the second exemplary embodiment according to FIG. 3 only in that the diode 5 is not arranged in the ground path 14, but rather in the high-voltage path 13. According to the invention, the parallel path 10 is intended to be electrically parallel to the diode 5 of the secondary circuit 2.2. The ground path 14 is connected to an electric ground, e.g. a vehicle ground, via the ground connector 17 in the third exemplary embodiment, as in the second exemplary embodiment.

Of course, the parallel path 10 according to the invention can in the third exemplary embodiment also be designed to comprise the switch 20 according to the second variant.

The invention claimed is:

1. An ignition device (1) for an internal combustion engine, the ignition device (1) comprising:

a primary circuit (2.1) and a secondary circuit (2.2), wherein:

the primary circuit (2.1) has a primary coil (3), wherein the secondary circuit (2.2) has a secondary coil (4) inductively coupled to the primary coil (3), a diode (5) for suppressing a start-up spark, and a high-voltage connector (6) for connection to a spark plug (7), wherein a parallel path (10) is formed electrically in parallel to the diode (5) of the secondary circuit (2.2), in which parallel path there is arranged an ohmic load resistor (11) and by means of which parallel path residual energy, which remains in the secondary circuit (2.2) following discharge of the ignition device (1), can be extinguished, bypassing the diode (5).

2. The ignition device according to claim 1, wherein the ohmic load resistor (11) of the parallel path (10) has an electric resistance that is greater than 1 MOhm.

3. The ignition device according to claim 2, wherein the ohmic load resistor (11) of the parallel path (10) is a wired resistor, an SMD resistor, or a conductor resistor.

4. The ignition device according to claim 3, wherein the conductor resistor comprises an electrically conductive material designed as a layer, a coating, a conductive track, or a jacket.

5. The ignition device according to claim 3, wherein the conductor resistor is arranged and/or designed to be on a surface of the diode (5).

6. The ignition device according to claim 1, wherein the connector ends (10.1) of the parallel path (10) are connected to connectors (5.1) of the diode (5).

7. The ignition device according to claim 1, wherein the residual energy can be fed to an electric ground via the parallel path (10).

8. The ignition device according to claim 1, wherein the secondary coil (4) has a first coil end (4.1) facing the high-voltage connector (6) and a second coil end (4.2) facing away from the high-voltage connector (6), wherein the secondary circuit (2.2) has a high-voltage path (13) connected at the first coil end (4.1) of the secondary coil (4) and a ground path (14) connected at the second coil end (4.2) of the secondary coil (4), wherein the diode (5) is arranged in the ground path (14) or in the high-voltage path (13).

9. An ignition coil comprising an ignition device according to claim 1.

10. An ignition device (1) for an internal combustion engine, the ignition device (1) comprising:

a primary circuit (2.1) and a secondary circuit (2.2), wherein:

the primary circuit (2.1) has a primary coil (3), wherein the secondary circuit (2.2) has a secondary coil (4) inductively coupled to the primary coil (3), a diode (5) for suppressing a start-up spark, and a high-voltage connector (6) for connection to a spark plug (7), wherein a parallel path (10) is formed electrically in parallel to the diode (5) of the secondary circuit (2.2), in which parallel path there is arranged an electric switch (20) and by means of which parallel path residual energy, which remains in the secondary circuit (2.2) following discharge of the ignition device (1), can be extinguished when the electric switch (20) is closed, bypassing the diode (5).

11. The ignition device according to claim 10, wherein the electric switch (20) of the parallel path (10) is designed to be switched between a spark breakaway and a recharging of the primary circuit (2.1) at a suitable time, wherein the switch (20) of the parallel path (10) comprises a semiconductor switch.

* * * * *